United States Patent Office 2,980,701
Patented Apr. 18, 1961

2,980,701
PROCESS FOR THE PREPARATION OF ISOMALEIMIDES

Carol K. Sauers, Middlebush, and Robert J. Cotter, New Brunswick, N.J., assignors to Union Carbide Corporation, a corporation of New York No Drawing. Filed Nov. 5, 1959, Ser. No. 851,028

8 Claims. (Cl. 260—343.6)

This invention relates to isomaleimides. More particularly, this invention relates to a process for the preparation of N-substituted isomaleimides.

The N-substituted isomaleimides which can be prepared in accordance with the present invention have the general formula:

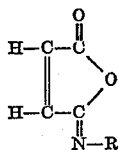

in which R is a monovalent hydrocarbon radical or a divalent hydrocarbon radical having as a substituent on its terminal carbon atom a radical having the formula:

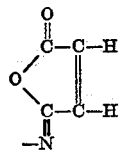

These latter N-substituted isomaleimides are commonly referred to as bis-isomaleimides.

The term "monovalent hydrocarbon radical" as used herein refers to substituted hydrocarbon radicals as well as unsubstituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-docosyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl; p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following: N-methyl isomaleimide, N-ethyl isomaleimide, N-n-propyl isomaleimide, N-allyl isomaleimide, n-butyl isomaleimide, N-tertiary butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-docosyl isomaleimide, N-cyclohexyl isomaleimide, N-(2-chloroethyl) isomaleimide, N-(2-bromoethyl) isomaleimide, N-(2-fluoroethyl) isomaleimide, N-(2-iodo-n-propyl) isomaleimide, N-(2-chloro-n-hexyl) isomaleimide, N-methoxymethyl isomaleimide, N-benzyl isomaleimide, N-(2-phenylethyl) isomaleimide, N-(3-phenyl-n-propyl) isomaleimide, N-(4-phenyl-n-butyl) isomaleimide, N-phenyl isomaleimide, N-naphthyl isomaleimide, N-(o-chlorophenyl) isomaleimide, N-(m-bromophenyl) isomaleimide, N-(p-fluorophenyl) isomaleimide, N-(o-iodophenyl) isomaleide, N-(o-methoxyphenyl) isomaleimide, N-(m-methoxyphenyl) isomaleimide, N-(p-ethoxyphenyl) isomaleimide, N-(p-n-butoxyphenyl) isomaleimide, N-(p-chloro-m-methylphenyl) isomaleimide, N-(o-methylphenyl) isomaleimide, N-(m-methylphenyl) isomaleimide, N-(o-ethylphenyl) isomaleimide, N-(m-ethylphenyl) isomaleimide, N-(p-ethylphenyl) isomaleimide, N-(o-isopropylphenyl) isomaleimide, N-(m-isopropylphenyl) isomaleimide, N-(p-isopropylphenyl) isomaleimide, N-(o-n-butylphenyl) isomaleimide, N-(m-n-butylphenyl isomaleimide, N-(4-hydroxy-2-naphthyl) isomaleimide, N-(4-hydroxy-1-naphthyl) isomaleimide, and the like.

The term "divalent hydrocarbon radical" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2 - bromotrimethylene, 2-chloropentamethylene, 3 - chlorohexamethylene, 2 - chlorooctamethylene, and the like; alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4-(2-methoxy cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene), and the like.

Among N-substituted isomaleimides wherein R in the formula previously noted is a divalent hydrocarbon radical having as a substituent on its terminal carbon atom a radical having the formula:

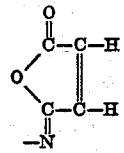

can be noted N,N'-ethylene bis-isomaleimide, N,N'-trimethylene bis-isomaleimide, N,N'-tetramethylene bis-isomaleimide, N,N'-decamethylene bis-isomaleimide, N,N'-(1,4-cyclohexane) bis-isomaleimide, N,N'-(2-chlorotrimethylene) bis-isomaleimide, N,N'-(2-bromotrimethylene) bis-isomaleimide, N,N'-(2-chlorotetramethylene) bis-isomaleimide, N,N'-3-(chlorohexamethylene) bis-isomaleimide, N,N'-2-(ethoxytetramethylene) bis-isomaleimide, N,N'-(1-ethoxytetramethylene) bis-isomaleimide, N,N'-[1,4-(2-methoxycyclohexane)] bis-isomaleimide, N,N'-(2-phenoxyethylene) bis-isomaleimide, N,N'-(2-phenoxytrimethylene) bis-isomaleimide, N,N'-[1,4-(2-phenoxycyclohexane)] bis-isomaleimide, N,N'-[1,4-(2-nitrocyclohexane)] bis-isomaleimide, N,N'-phenyl ethylene bis-isomaleimide, N,N'-(2-phenylethylene) bis-isomaleimide, N,N'-(2-phenyltrimethylene) bis-isomaleimide, N,N'-(2-phenyl tetramethylene) bis-isomaleimide, N,N'-(1-phenyldodecamethylene) bis-isomaleimide, N,N'-(1,4-phenylene) bis-isomaleimide, N,N'-(1,5-naphthalene) bis-isomaleimide, N,N'-[1,4-(2-chlorophenylene)] bis-isomaleimide, N,N'-[1,4-(2-bromophenylene)] bis-isomaleimide, N,N'-[1,4-(2-methoxyphenylene)] bis-isomaleimide, N,N'-[1,4-(2-ethoxyphenylene)] bis-isomaleimide, N,N'-[1,4-(2-phenoxyphenylene)] bis-isomaleimide, N,N'-[1,4-(2-methylphenylene)] bis-isomaleimide, N,N'-[1,4-(2-ethylphenylene)] bis-isomaleimide, N,N'-(4,4'-diphenyl methane) bis-isomaleimide, N,N'-(4,4'-diphenylether) bis-isomaleimide, N,N'[1,4-(2-n-dodecylphenylene)] bis-isomaleimide, N,N'-(4,4'-benzophenone) bis-isomaleimide, and the like.

Particularly desirable compounds for purposes of this invention are those wherein R is either a monovalent or divalent radical as previously described having a maximum of 20 carbon atoms and being free of interfering groups such as —COOH and $NH_2$.

In its broadest aspect, the process by which the N-substituted isomaleimides of the present invention are prepared is conducted by reacting the salt of an N-substituted maleamic acid having the general formula:

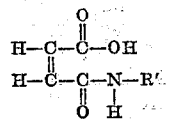

in which R' is a monovalent hydrocarbon radical as previously defined for R, or a divalent hydrocarbon radical, also as previously defined for R, having as a substituent on its terminal carbon atom a radical having the formula:

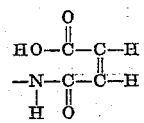

with an acid halide.

In a more specific embodiment of the present invention, the aforementioned maleamic acid is reacted with a base such as a tertiary amine and the corresponding salt obtained is then reacted with an acid halide to produce the N-substituted isomaleimide.

The term "acid halide" as used herein is intended to encompass those compounds having the formula:

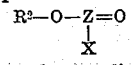

wherein $R^2$ is a hydrocarbon radical, Z is carbon or sulfur, and X is a halogen atom, i.e., chlorine, bromine, fluorine, or iodine.

Illustrative radicals for $R^2$ are methyl, ethyl, n-propyl, n-butyl, n-amyl, n-hexyl, 2-ethyl-n-hexyl, n-heptyl, n-octyl, n-nonyl, n-dodecyl, cyclohexyl, phenyl, o-methylphenyl, p-methylphenyl, o-ethylphenyl, p-ethylphenyl, naphthyl, and the like. Particularly suitable hydrocarbon radicals for $R^2$ are those having a maximum of 12 carbon atoms and being free of olefinic and acetylenic unsaturation.

The preparation of an N-substituted isomaleimide in accordance with the present invention wherein R' is a monovalent hydrocarbon radical can be illustrated by the reaction between the triethyl ammonium salt of N-n-butyl maleamic acid and ethyl chloroformate to produce N-n-butyl isomaleimide. This reaction can be represented by the following equations:

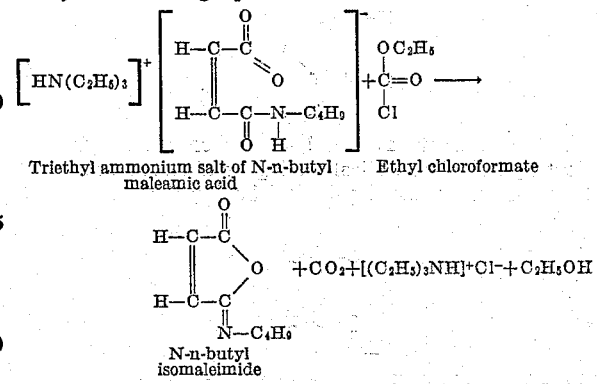

The preparation of an N-substituted isomaleimide wherein R' is a divalent hydrocarbon having as a substituent on its terminal carbon atom, the radical previously defined is exemplified by the reaction between the triethyl ammonium salt of N,N'-(4,4'-diphenylmethane) bis-maleamic acid and ethyl chloroformate to produce N,N'-(4,4'-diphenylmethane) bis-isomaleimide.

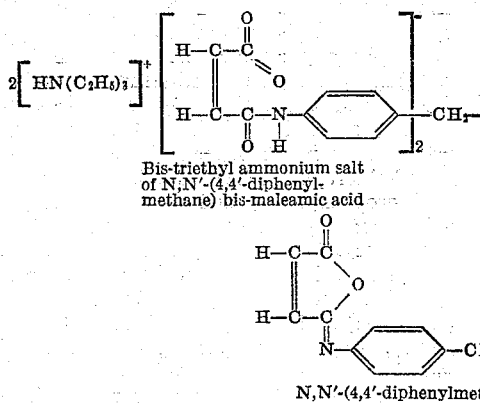

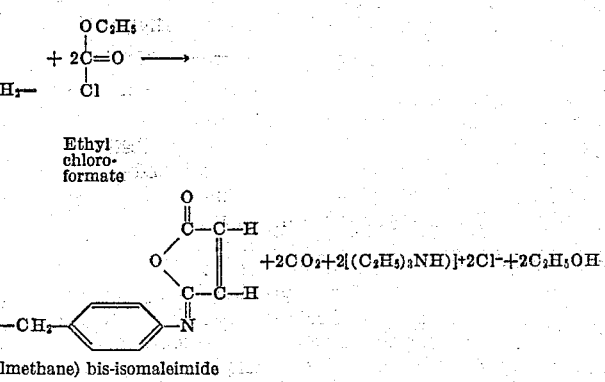

N,N'-(4,4'-diphenylmethane) bis-isomaleimide

Various amounts of the salts of the N-substituted maleamic acids and the acid halides can be reacted to produce the corresponding isomaleimides. Using from about two-tenths to about 5 times the stoichiometric amount of an acid halide required for complete reaction with the salt of an N-substituted maleamic acid is satisfactory. Using more than about 5 times the stoichiometric amount of acid halide does not materially increase the yield of N-substituted isomaleimide and is economically unattractive. Optimum results are achieved using a stoichiometric amount of acid halide. For purposes of stoichiometric calculations, one acid halide group

wherein X is a halogen atom, is deemed to react with one

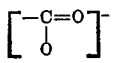

group of the salt of the N-substituted maleamic acid.

The temperature at which the reaction between the salt of an N-substituted maleamic acid and an acid halide is conducted can be varied over a wide range, from as low as −70° C. to a temperature just below the decomposition temperature of the reactants and of the isomaleimide product formed. At temperatures lower than about −70° C., the reaction proceeds sluggishly. A temperature in the range of about −5° C. to about 85° C. is most preferred.

It is also preferred to conduct the reaction between the salts of N-substituted maleamic acids and the acid halides in the presence of an organic diluent which is a solvent for the starting materials and is non-reactive with respect to the starting material and the final product.

The reaction between a salt of a N-substituted maleamic acid and an acid halide is exothermic. If an organic diluent is not present, it may be difficult to remove the heat of reaction, which, if not removed, might cause undesirable side reactions to occur. In addition, the use of an organic diluent facilitates removal of the N-substituted isomaleimide from the starting materials.

The actual organic diluent used willl depend upon the starting materials and the temperature at which the reaction is to be conducted. The organic diluent should have a boiling point at or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxy benzene and the like; aliphatic hydrocarbons, such as n-hexane, n-heptane, and the like; halogenated aliphatic hydrocarbons, such as dichloromethane, 1,2-dichloroethane, and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide and the like.

The reaction between the salt of the N-substituted maleamic acid and the acid halide is conducted, generally, under atmospheric pressures, although, if desired, the reaction can be conducted under subatmospheric or superatmospheric pressure.

The process of the present invention is conducted by simply admixing the salt of an N-substituted maleamic acid with an acid halide at the desired temperature. The reaction between the salt of N-substituted maleamic acids and acid halides to produce the corresponding isomaleimides is practically instantaneous in that some isomaleimide is formed immediately upon mixture of the reactants. Usually, however, the reaction mixture is allowed to stand for at least about one hour in order to insure that the reaction has proceeded to completion. The termination of the reaction is evidenced by the termination of carbon dioxide generation.

Recovery of the N-substituted isomaleimide from the reaction mixture can be accomplished by any one of a number of convenient methods, for example, by subjecting the reaction mixture to filtration, distillation, evaporation, or any combination of the three, depending upon the nature of the N-substituted isomaleimide produced. If desired, the N-substituted isomaleimide, after removal from the reaction mixture, can be washed with water or with an aqueous solution of sodium bicarbonate, can be taken up by an organic diluent, and passed through a Florisil column, or if a solid, it can be recrystallized from suitable solvents such as the organic liquids previously noted in this specification as organic diluents.

Any salt of the desired N-substituted maleamic acid, wherein the hydrogen of each carboxylic acid group has been replaced by a cation, can be used to react with the acid halides in accordance with the present invention. Particularly desirable are the ammonium salts of N-substituted maleamic acids produced by reacting from about 1 to about 2 times the stoichiometric amount of an organic tertiary amine with an N-substituted maleamic acid. Using more than about twice the stoichiometric amount of an organic tertiary amine for reaction with an N-substituted maleamic acid does not materially increase the yield of the corresponding ammonium salt of the maleamic acid. Optimum results are achieved using about 1.25 times the stoichiometric amount of an organic tertiary amine. For purposes of stoichiometric calculations, one amine group

is deemed to react with one carboxylic acid group, —COOH.

Any of the organic tertiary amines can be reacted with the N-substituted maleamic acids previously described. Particularly preferred are the organic tertiary amines which are free of interfering groups such as —COOH and —NH$_2$, having a maximum of 20 carbon atoms and also being free of olefinic and acetylenic unsaturation. Among suitable organic tertiary amines can be noted trimethylamine, triethylamine, tri-n-propylamine, tri-n-butylamine, tri-n-amylamine, tri-n-hexylamine, tri-(2-ethyl-n-hexyl) amine, tri-n-heptylamine, dimethyl butylamine, methyl hexylpropyl amine, N-methyl-N-ethyl aniline, N,N′-dimethyl-p-ethoxy aniline, N-methyl morpholine, N-ethyl morpholine, N,N′-dimethyl anisidine, 2-chloropyridine, 4-chloropyridine, quinuclidine, quinoline, N,N′-dimethyl piperazine, and the like.

The reaction between the organic tertiary amine and the N-substituted maleamic acid can be conducted under conditions and at temperatures previously described as suitable for the reaction between the salt of an N-substituted maleamic acid and an acid halide.

Rather than reacting each set of reactants in separate stages, a reaction mixture can be prepared, if desired, in which there is present the N-substituted maleamic acid, a base, e.g. an organic tertiary amine, and an acid halide. The route of the overall reaction will proceed as previously described in that the organic tertiary amine will react with the N-substituted maleamic acid to form the corresponding ammonium salt and this salt will then react with the acid chloride to produce the corresponding isomaleimide.

The N-substituted maleamic acid intermediates which can be used in the preparation of the corresponding isomaleimides of the present invention can be obtained by reacting, in suitable solvents, approximately equimolar quantities of a primary mono- or primary diamine with maleic anhydride. In producing an N-substituted maleamic acid having the formula previously given wherein R′ is a monovalent hydrocarbon radical, the following primary mono-amines can be used: methylamine, ethylamine, isopropylamine, n-butylamine, isobutylamine, isoamylamine, n-hexylamine, n-heptylamine, n-octylamine, n-dodecylamine, cyclohexylamine, 2-chloroethylamine, 2-bromoethylamine, 2-fluoroethylamine, 2-iodopropylamine, chlorocyclohexylamine, methoxymethylamine, 2-phenoxy-n-propylamine, benzylamine, 2-phenethylamine, 3-phenyl-n-propylamine, 4-phenyl-n-butylamine, naphthylamine, p-toluidine, o-p-xylylidine, o-ethylaniline, m-ethylaniline, p-ethylaniline, o-isopropylaniline, m-isopropylaniline, p-isopropylaniline, o-n-butylaniline, m-n-butylaniline, p-n-butylaniline, p-n-octylaniline, o-chloroaniline, m-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, o-toluidine, m-toluidine, 4-sulfamylaniline, and the like.

In producing an N-substituted maleamic acid having the formula previously given wherein R' is a divalent hydrocarbon radical, the following primary diamines can be used: 1,2-diaminoethane, 1,3-diamino-n-propane, 1,4-diamino-n-butane, 1,5-diamino-n-pentane, 1,6-diamino-n-hexane, 1,10-diamino-n-decane, 1,4-phenylene diamine, 4,4'-diamino-diphenylmethane, and the like. Process for producing maleamic acids is further described in Example 1 of this application and also in the book "Maleic Anhydride Derivatives" by L. A. Flett and W. H. Gardner, incorporated herein by reference.

The N-substituted isomaleimides of the present invention can be used as fungicides and defoliants. These compounds can also be isomerized to the corresponding maleimides which are known compounds having wide utility as insecticides. The so-called bis-isomaleimides of the present invention have particular utility in that they can be polymerized with primary diamines to produce polymers which can be molded into various articles, such as lamp bases, television cabinets, and the like, as well as extruded into film material which can be used as wrapping material for food articles, such as bread, meat, and the like. Moreover, these polymers can be cross-linked with sulfur to form infusible, insoluble products.

The following examples further illustrate the present invention and are not intended to limit the scope thereof in any manner.

EXAMPLE 1

Preparation of N-n-butyl isomaleimide

Into a dry, round bottom, Pyrex glass flask equipped with a stirrer, thermometer, dropping funnel, and reflux condenser, there was charged 100 ml. of dichloromethane having 9.8 grams (0.1 mole) of maleic anhydride dissolved therein. 7.4 grams (0.1 mole) of n-butylamine were then added to the dichloromethane solution to yield a slurry of N-n-butyl maleamic acid.

The slurry of N-n-butyl maleamic acid was cooled to a temperature of between about 0° C. and 5° C. and 10.1 grams (0.1 mole) of triethylamine was added in small portions while stirring the contents of the flask to produce the triethyl ammonium salt of N-n-butyl maleamic acid, which was soluble in dichloromethane. During the addition of the triethylamine to the slurry of N-n-butyl maleamic acid the temperature of the contents of the flask was maintained below about 10° C. The solution of the triethyl ammonium salt of N-n-butyl maleamic acid in dichloromethane was cooled to a temperature of between about 0° C. and 5° C. The temperature of the solution was maintained at between about 0° C. and 5° C. during the dropwise addition thereto over a period of ½ to 1 hour of 11.9 grams (0.11 mole) of ethyl chloroformate. Evolution of carbon dioxide began after the first 2–3 minutes of the initial addition of the ethyl chloroformate. The reaction mixture was stirred for another ½ to 1 hour at between about 0° C. and 5° C. after the last addition of the ethyl chloroformate, and then allowed to warm to room temperature, about 25° C. The reaction mixture was filtered, removing precipitated triethylamine hydrochloride. The filtrate was transferred to a separatory funnel and washed successively with 100 ml. additions of water, of a saturated aqueous solution of sodium bicarbonate, and again water. The organic layer containing the N-n-butyl isomaleimide was removed from the aqueous layer and dried over magnesium sulfate. The dichloromethane was distilled under reduced pressure. The residual dark liquid was distilled under 1 mm. Hg pressure at a temperature of 62° C.–67° C. and yielded 12 grams of N-n-butyl isomaleimide, corresponding to a yield of 78% by weight based on the theoretical yield.

The infra-red spectrum of a liquid film showed bands at $5.5\mu$ and $5.90\mu$ which are consistent with the isomaleimide structure.

Calculated for $C_8H_{11}NO_2$: C, 62.72; H, 7.24; N, 9.15. Found: C, 62.98; H, 7.22; N, 9.25.

The boiling point of the N-n-butyl isomaleimide under pressure of 1 mm. Hg was 62° C.–67° C., index of refraction at 25° C.—1.4868–1.4870.

EXAMPLE 2

Preparation of N-phenyl isomaleimide

Into a dry, round bottom, Pyrex glass flask equipped with a stirrer, thermometer, dropping funnel, and reflux condenser there was charged 300 ml. of dichloromethane having 4 grams (0.25 mole) of N-phenyl maleamic acid dissolved therein. The flask was then placed in a ice-salt bath and 25 grams (0.25 mole) of triethylamine were added dropwise into the flask, thereby producing the triethyl ammonium salt of N-phenyl maleamic acid, which was soluble in dichloromethane. The triethyl ammonium salt solution was cooled to a temperature of between about 0° C. and 5° C. and to the cooled solution there was then added dropwise 27 grams (0.25 mole) of ethyl chloroformate over a period of ½ to 1 hour. During this addition the temperature of the triethyl ammonium salt solution was maintained below 10° C. Evolution of carbon dioxide began after the first 2–3 minutes of the initial addition of the ethyl chloroformate. The solution became bright yellow. After all the ethyl chloroformate was added, the mixture was stirred for an additional ½ hour to 1 hour at 10° C., then allowed to warm to room temperature. The reaction mixture was filtered in order to remove precipitated triethylamine hydrochloride. The filtrate was washed successively with approximately equal volumes (300 ml.) of water, of a saturated aqueous solution of sodium bicarbonate, and of water. The organic layer containing the N-phenyl isomaleimide was removed from the aqueous layer and dried over magnesium sulfate. Dichloromethane was then removed under reduced pressure. The residual liquid was distilled under 1 mm. Hg pressure and at a temperature of 119° C.–129° C. On recrystallization of this product from carbon tetrachloride, there was obtained 20 grams of N-phenyl isomaleimide in the form of pale yellow crystals. Further purifying the N-phenyl isomaleimide by passing it through a column of Florisil in benzene and recrystallizing from a 50–50 by volume mixture of benzene and diethyl ether, there was obtained a product having a melting point of 61.5° C.–62.5° C.

Calculated for $C_{10}H_7O_2N$: C, 69.36; H, 4.07; N, 8.09. Found: C, 69.61; H, 4.17; N, 8.27.

The infra-red spectrum of the product contained bands at $5.6\mu$ and $5.8\mu$ which are consistent with the isomaleimide structure.

EXAMPLE 3

Preparation of N,N'-(4,4'-diphenylmethane) bis-isomaleimide

Into a dry, round bottom, Pyrex glass flask equipped with a stirrer, thermometer, dropping funnel, and reflux condenser containing 125 ml. of dichloromethane there was added 19.7 grams (0.05 mole) of N,N'-(4,4'-diphenylmethane) bis-maleamic acid. The mixture was then cooled to 5° C. To the mixture there was added in small portions 10.1 grams (0.1 mole) of triethylamine with stirring while the reaction temperature was maintained at about 5° C., thereby forming the bis-triethyl ammonium salt of N,N'-(4,4'-diphenylmethane) bis-maleamic acid, which was soluble in the dichloromethane. After all of the triethylamine had been added, stirring of the ammonium salt solution was continued and the solution cooled to a temperature of −5° C. 11.9 grams (0.11 mole) of ethyl chloroformate were then added to the solution while the temperature of the solution was maintained below about 7° C. Evolution of carbon dioxide began 2 minutes after the initial addition of ethyl chloroformate. The mixture was stirred at 0° C. for ½ hour after the final addition of ethyl chloroformate and then stirred an additional 35 minutes at room temperature. The reaction mixture was filtered in order to remove precipitated triethylamine hydrochloride. The filtrate was transferred to a separatory funnel and washed successively with approximately equal volumes (125 ml.) of water, saturated aqueous solution of sodium bicarbonate and again water. The organic layer containing the N,N'-(4,4'-diphenylmethane) bis-isomaleimide was removed from the aqueous layers, and dried over magnesium sulfate. The dichloromethane was removed under reduced pressure.

8.5 grams of a yellow solid were obtained having a melting point of 145° C.–150° C. Infra-red analysis showed bands at $5.5\mu$, $5.84\mu$, $5.95\mu$, $6.25\mu$, and $6.60\mu$ which are consistent with the isomaleimide structure.

A mixture melting point with N,N'-(4,4'-diphenylmethane) bis-maleimide (M.P. 150° C.) was depressed.

Calculated for $C_{21}H_{14}N_2O_4$: C, 70.39; H, 3.94; N, 7.82. Found: C, 70.81; H, 4.31; N, 7.66.

EXAMPLE 4

*Preparation of N-n-butyl isomaleimide*

Into a dry, round bottom Pyrex glass flask equipped with a stirrer, thermometer, dropping funnel, and reflux condenser, there was charged 200 ml. of benzene. The benzene was heated to reflux and to the refluxing benzene there was added dropwise 10.1 grams (0.1 mole) of triethylamine, then 17.3 grams (0.1 mole) of N-n-butyl maleamic acid, and then 11.9 grams (0.11 mole) of ethyl chloroformate. After the final addition was made into the flask, the mixture was stirred and refluxed for one hour, then cooled to room temperature while being stirred. The reaction mixture was filtered, removing precipitated triethylamine hydrochloride. The filtrate, containing the N-n-butyl isomaleimide was concentrated by evaporating off the benzene under reduced pressure. The residue was distilled at a pressure of 1–2 mm. Hg and at a temperature of 60° C.–65° C. Ten grams of N-n-butyl isomaleimide were obtained.

EXAMPLE 5

*Preparation of N-n-butyl isomaleimide*

Into a dry, round bottom Pyrex glass flask equipped with a stirrer, thermometer, dropping funnel, and reflux condenser there was charged a solution of 68 grams (0.4 mole) of N-n-butyl maleamic acid dissolved in one liter of dichloromethane. The solution was cooled by placing the flask in an ice-salt-water bath and into the flask there was added dropwise over a period of 20 minutes, 47 grams (0.45 mole) of triethylamine. The mixture was then cooled to 0° C.–5° C. and ethyl chloroformate added thereto dropwise over a period of 20 minutes. The resultant mixture was stirred at a temperature slightly below 15° C. for 1½ hours. The reaction mixture was filtered, removing the precipitated triethylamine hydrochloride. The filtrate was transferred to a separatory funnel and washed successively with approximately equal volumes (1000 mls.) of water and a saturated aqueous solution of sodium bicarbonate. The organic layer containing the N-n-butyl isomaleimide was removed from the aqueous layers, dried over magnesium sulfate, filtered, and the dichloromethane evaporated therefrom under reduced pressure. The crude liquid product was distilled through a Vigreux column and three fractions were obtained totaling 56 grams of N-n-butyl isomaleimide.

What is claimed is:

1. Process for the preparation of an N-substituted isomaleimide which comprises reacting an ammonium salt of an N-substituted maleamic acid, said acid having the formula:

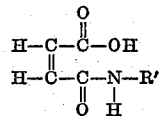

wherein R' is a member selected from the group consisting of a monovalent hydrocarbon radical, and a divalent hydrocarbon radical having as a substituent on its terminal carbon atom a radical having the formula:

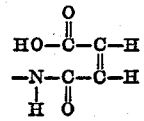

with an acid halide having the formula:

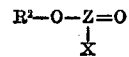

wherein $R^2$ is a hydrocarbon radical, Z is a member selected from the group consisting of a carbon atom and a sulfur atom, and X is a halogen atom, for a period of time sufficient to produce the corresponding isomaleimide.

2. Process as defined in claim 1 wherein the salt is the triethyl ammonium salt of N-n-butyl maleamic acid.

3. Process as defined in claim 1 wherein the salt is the triethyl ammonium salt of N-phenyl maleamic acid.

4. Process as defined in claim 1 wherein the salt is the bis-triethyl ammonium salt of N,N'-(4,4'-diphenylmethane) bis-maleamic acid.

5. Process as defined in claim 1 wherein the acid halide is ethyl chloroformate.

6. Process as defined in claim 1 wherein the reaction is conducted at a temperature ranging from about −70° C. to a temperature below the decomposition temperature of the starting materials and of the isomaleimide product formed.

7. Process as defined in claim 1 wherein the reaction is conducted at a temperature in the range of about −5° C. to about 85° C.

8. Process as defined in claim 1 wherein the acid halide is present in an amount of about 0.2 to about 5 times the stoichiometric quantity required for complete reaction with the said ammonium salt of the N-substituted maleamic acid.

No references cited.